US012608776B2

(12) United States Patent
Trythall

(10) Patent No.: US 12,608,776 B2
(45) Date of Patent: Apr. 21, 2026

(54) TECHNIQUES FOR MODIFYING AN IMAGE TO REDUCE SMEAR

(71) Applicant: BAE SYSTEMS plc, London (GB)

(72) Inventor: Simon Trythall, Rochester (GB)

(73) Assignee: BAE SYSTEMS PLC, London (GB)

( * ) Notice: Subject to any disclaimer, the term of this patent is extended or adjusted under 35 U.S.C. 154(b) by 314 days.

(21) Appl. No.: 18/261,002

(22) PCT Filed: Dec. 21, 2021

(86) PCT No.: PCT/GB2021/053397
§ 371 (c)(1),
(2) Date: Jul. 11, 2023

(87) PCT Pub. No.: WO2022/148946
PCT Pub. Date: Jul. 14, 2022

(65) Prior Publication Data
US 2024/0095890 A1 Mar. 21, 2024

(30) Foreign Application Priority Data

Jan. 11, 2021 (EP) ..................................... 21275001
Jan. 11, 2021 (GB) ..................................... 2100321

(51) Int. Cl.
*G06T 5/73* (2024.01)
*G06T 5/10* (2006.01)
*G06T 5/20* (2006.01)
*G06T 7/20* (2017.01)
*G06V 10/24* (2022.01)
(Continued)

(52) U.S. Cl.
CPC .................. *G06T 5/73* (2024.01); *G06T 5/10* (2013.01); *G06T 5/20* (2013.01); *G06T 7/20* (2013.01);
(Continued)

(58) Field of Classification Search
CPC ... G06T 5/73; G06T 5/50; G06T 2207/20201; G06T 5/70; G06T 5/10; G06T 5/20;
(Continued)

(56) References Cited

U.S. PATENT DOCUMENTS 8,446,503 B1 5/2013 Koenck et al.
8,823,809 B1 9/2014 Jensen et al.
(Continued)

FOREIGN PATENT DOCUMENTS

WO WO2018101007 A1 6/2018
WO 2022148946 A1 7/2022

OTHER PUBLICATIONS

International Search Report and Written Opinion received for PCT/GB2021/053397, mailed Mar. 3, 2022. 14 pages.
(Continued)

*Primary Examiner* — Sumati Lefkowitz
*Assistant Examiner* — Ryan P Potts
(74) *Attorney, Agent, or Firm* — Arcane Law PLLC

(57) ABSTRACT

Techniques to modify an image from a night vision camera so as to reduce smear. An example method comprises receiving at least one image from a night vision camera; modifying the at least one image, based on motion data from a tracker system and a shutter time of night vision camera, to reduce smear in the image; and outputting the modified at least one image.

20 Claims, 10 Drawing Sheets

(51) Int. Cl.
   *H04N 23/68*          (2023.01)
   *H04N 25/62*          (2023.01)

(52) U.S. Cl.
   CPC ........... *G06V 10/24* (2022.01); *H04N 23/681*
   (2023.01); *H04N 23/6812* (2023.01); *H04N*
   *23/683* (2023.01); *H04N 25/62* (2023.01);
   *G06T 2207/10016* (2013.01); *G06T*
   *2207/20056* (2013.01); *G06T 2207/20201*
   (2013.01); *G06T 2207/20216* (2013.01)

(58) Field of Classification Search
   CPC ............. G06T 7/20; G06T 2207/10016; G06T
   2207/20056; G06T 2207/2021; G06T
   2207/20216; G06V 10/24; H04N 25/62;
   H04N 23/6812; H04N 23/681; H04N
   23/683
   See application file for complete search history.

(56)               References Cited

U.S. PATENT DOCUMENTS 8,830,360  B1     9/2014  Burt et al.
   9,998,666  B2     6/2018  Sapiro et al.

| | | | | |
|---|---|---|---|---|
| 10,997,697 | B1 * | 5/2021 | Newman | ................. H04N 23/51 |
| 2006/0177145 | A1 * | 8/2006 | Lee | ......................... G06V 10/30 |
| | | | | 382/298 |
| 2007/0165961 | A1 * | 7/2007 | Lu | .............................. G06T 5/73 |
| | | | | 382/254 |
| 2011/0149163 | A1 * | 6/2011 | Nishi | ......................... G06T 5/73 |
| | | | | 348/E5.022 |
| 2016/0189429 | A1 * | 6/2016 | Mallinson | ............ G02B 27/017 |
| | | | | 345/633 |
| 2017/0064204 | A1 * | 3/2017 | Sapiro | ........................ G06T 5/20 |
| 2018/0255232 | A1 * | 9/2018 | Takahashi | ............ H04N 23/951 |
| 2019/0362477 | A1 * | 11/2019 | Rahmati | ................... G06T 5/70 |

OTHER PUBLICATIONS

Combined Search and Examination Report under Sections 17 and 18(3) received for GB application No. 2100321.5, dated Oct. 21, 2021. 12 pages.
Extended European Search Report received for EP application No. 21275001.2, dated May 28, 2021. 6 pages.
Rajakaruna, et al., "Inertial Data Based Deblurring for Vision Impaired Navigation," International Conference on Indoor Positioning and Indoor Navigation (Oct. 27, 2014). 5 pages.

* cited by examiner

100

Receiving at least one image    110

Modifying the at least one image    120

Outputting the at least one modified image    130

Figure 2:
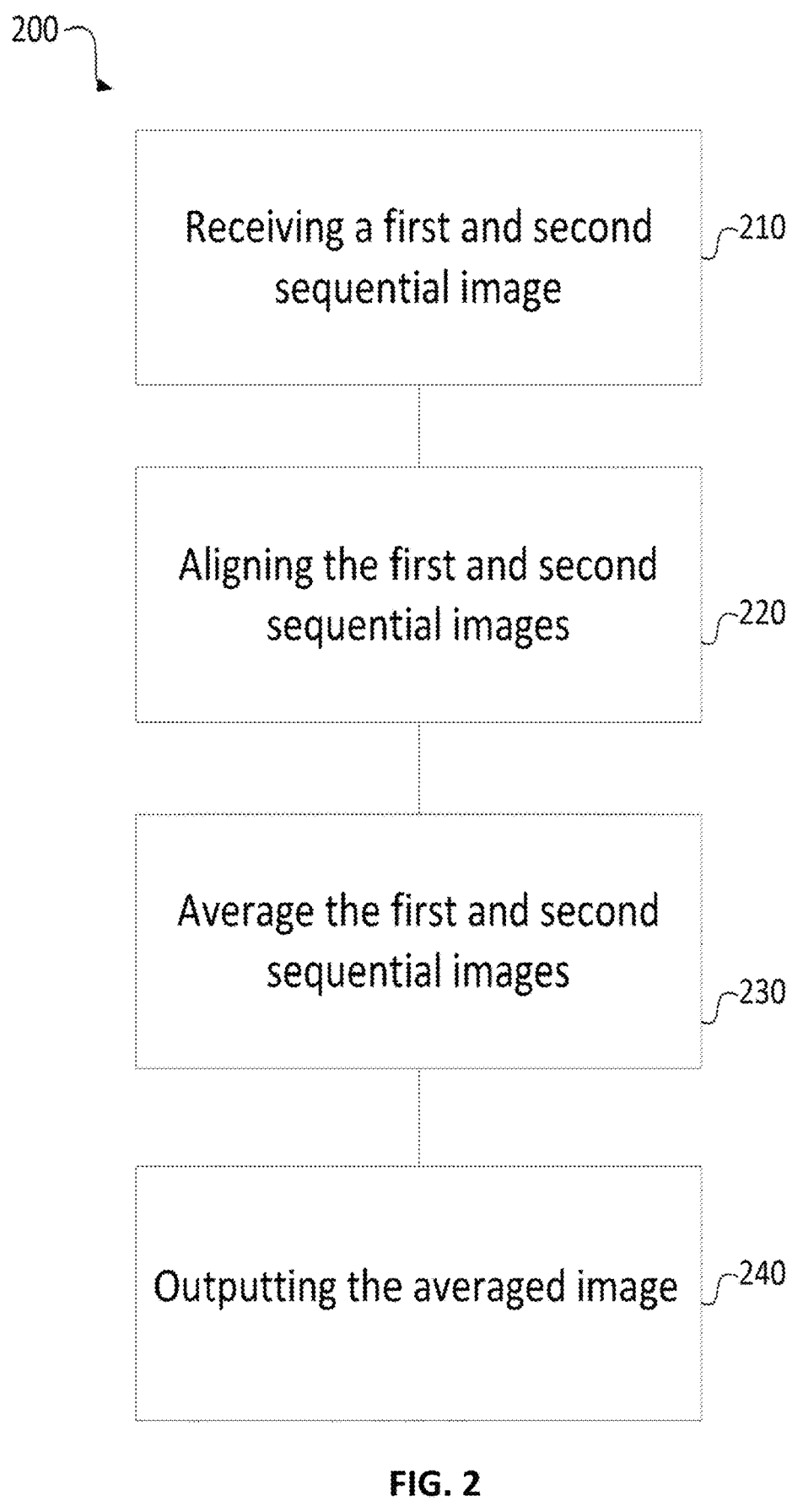

Receiving a first and second sequential image ⌐210

Aligning the first and second sequential images ⌐220

Average the first and second sequential images ⌐230

Outputting the averaged image ⌐240

Receiving n sequential images — 310

Aligning n sequential images — 320

Average n sequential images — 330

Outputting the averaged image — 340

400

Receiving at least one image        410

Estimate smearing based on tracker motion data        420

Filter the at least one image based on the estimated smearing        430

Outputting the at least one filtered image        440

Smeared Image due to motion and added speckle and noise due to Camera

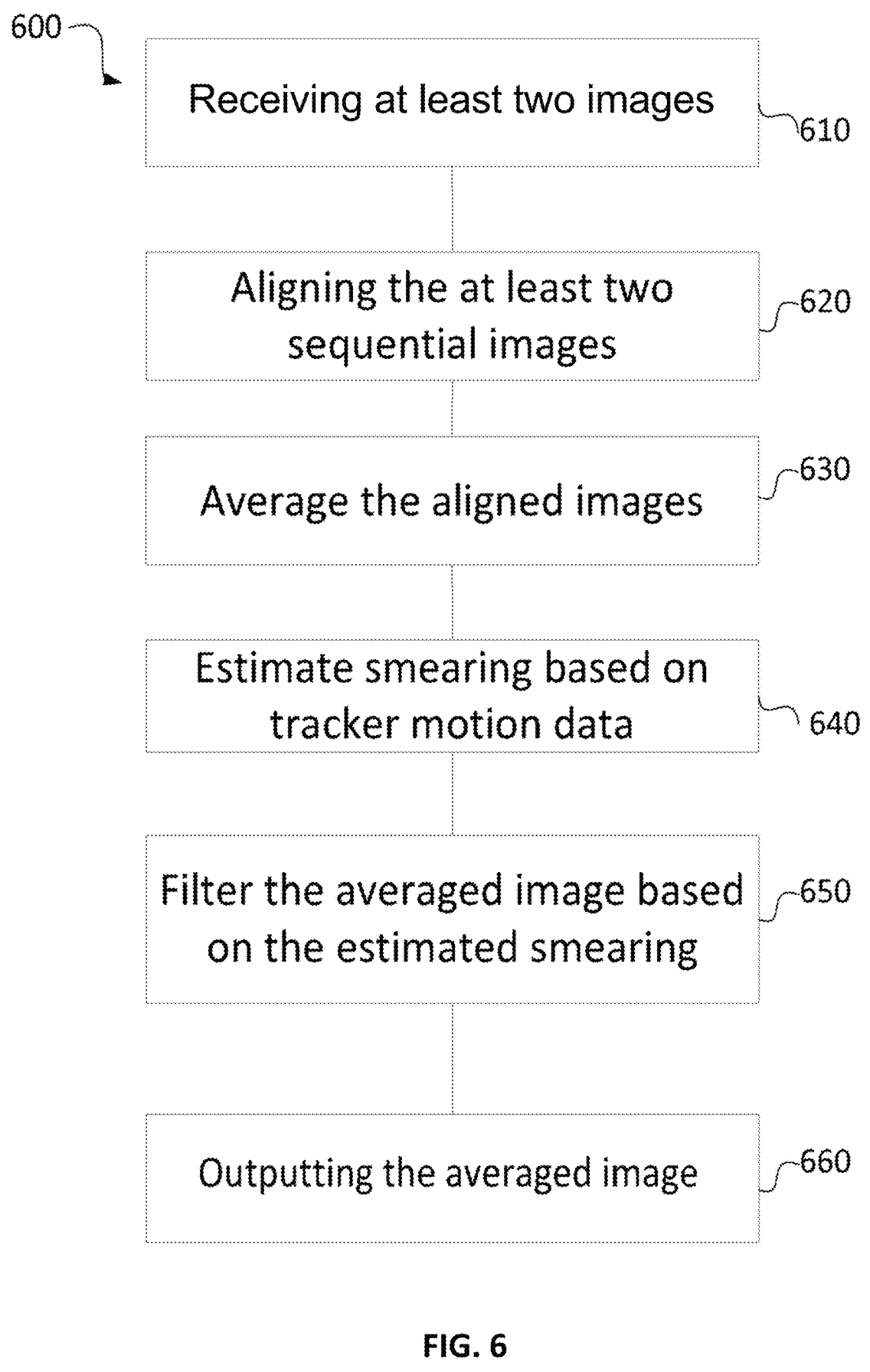

600

Receiving at least two images — 610

Aligning the at least two sequential images — 620

Average the aligned images — 630

Estimate smearing based on tracker motion data — 640

Filter the averaged image based on the estimated smearing — 650

Outputting the averaged image — 660

FIG. 6

TECHNIQUES FOR MODIFYING AN IMAGE TO REDUCE SMEAR

BACKGROUND

Night vision cameras may be used in display systems to display an image to a user when light levels are too low for conventional visible light cameras. To maximise the sensitivity of the night vision camera, the shutter time is as long as practical. However, a long shutter time may lead to smear, as the user may move whilst the shutter is open. This reduces image quality and therefore users may miss critical details in the scenes captured by the night vision camera.

BRIEF DESCRIPTION OF DRAWINGS

FIG. 1 illustrates a method to modify an image according to some examples.

FIG. 2 illustrates a method to align and average two sequential images according to some examples.

FIG. 6 illustrates a method to align, average and filter an image according to some examples.

DETAILED DESCRIPTION

Figure 3:
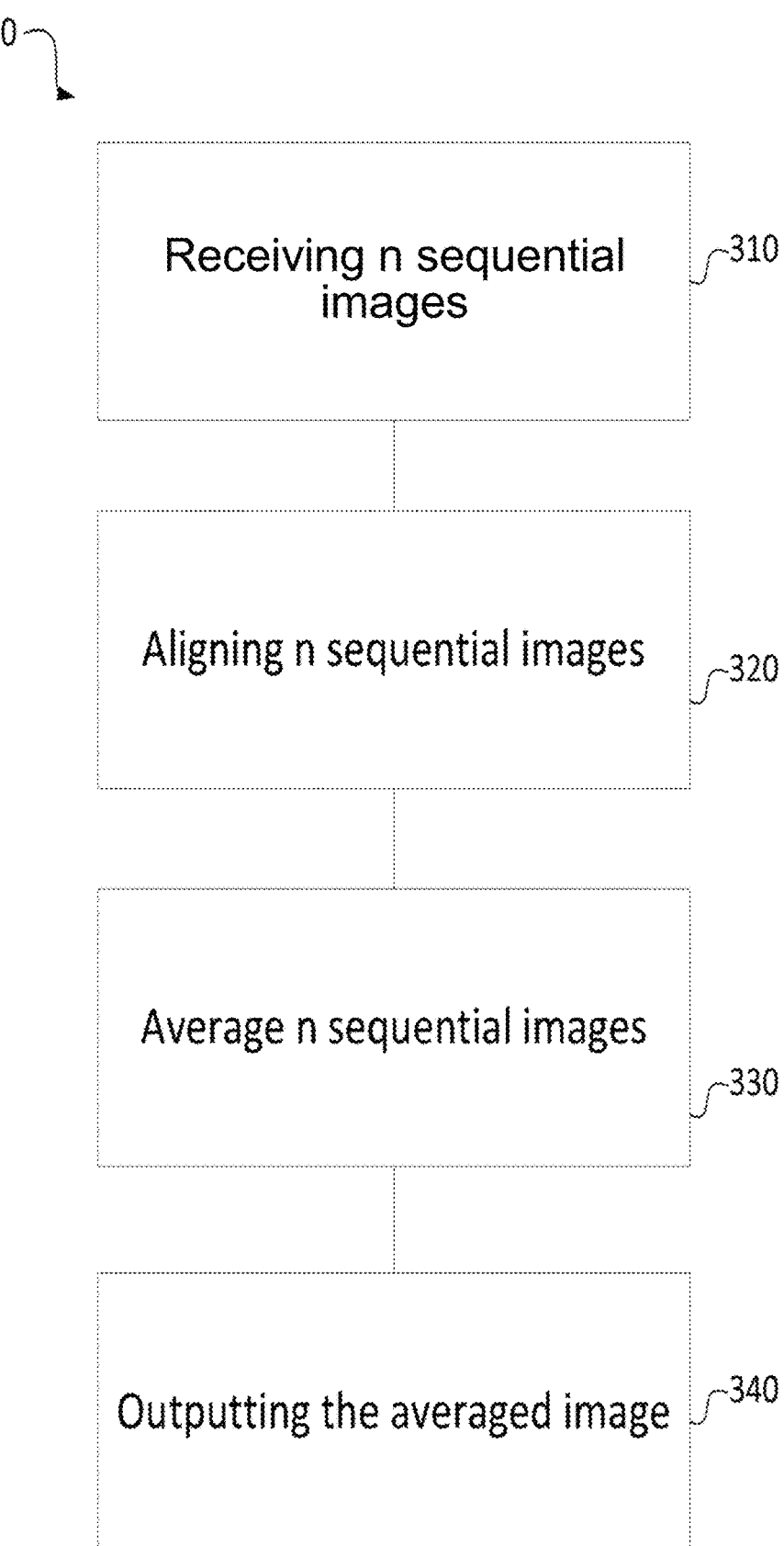
FIG. 3 illustrates a method to align and average an image over n sequential images according to some examples.

Night vision cameras (NVC) may be used when light levels are too low for conventional visible light cameras to display an image to a user with usable detail. In order to increase the amount of light received by the NVC, the shutter time may be maximised. However, this has an effect of inducing smear in the image when there is movement. Smear deteriorates the image and may obscure critical features in the image. This may reduce safety or user effectiveness when the NVC is used as part of a display system, especially in fast moving systems such as in head mounted displays or head up displays in aircraft or vehicles.

A typical approach to reduce smear may be to decrease the shutter time. However, decreasing the shutter time would likely increase the signal to noise ratio (SNR) of the image and in order to compensate for the reduced shutter time integration over a number of images may be required.

In many applications a known tracker system may be included. For example a head worn display comprises a tracker system to track the orientation of the display in its environment. Tracker systems may also be used on drones, where an image is provided to a user. The tracker system may output motion data related to the reference frame of the tracker system, and/or an object tracked by the tracker system. For example, in an example comprising a tracker system used to track a head mounted display on aircraft, the tracker system may track the motion of the aircraft and also the motion of the HWD in the aircraft. Typically, the object comprises the NVC. The motion data may be used to mitigate the effects of the smearing, as the tracker system may track the movement of the NVC.

Figure 1:
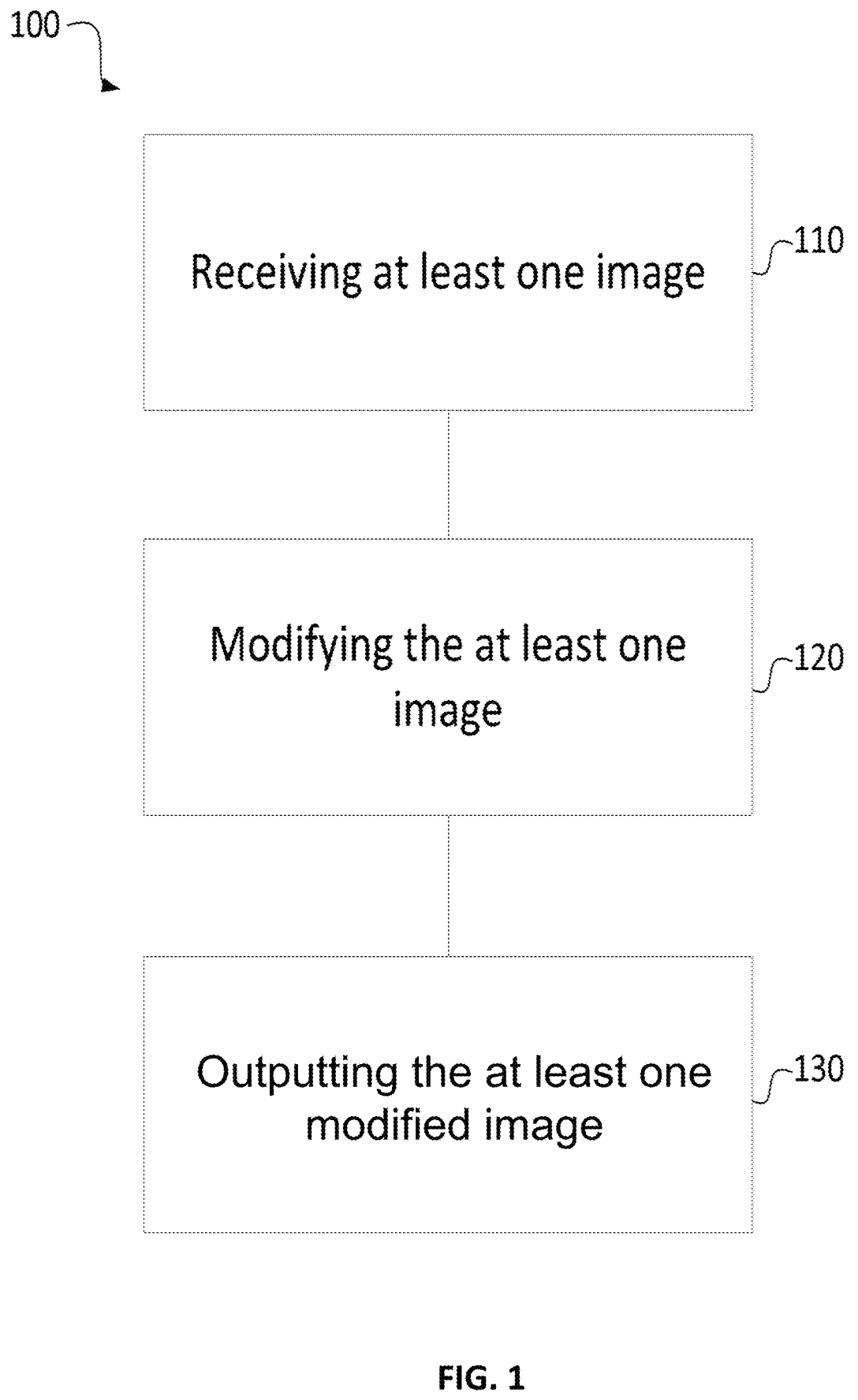

A method to mitigate smear without increasing SNR or decreasing the shutter time is described with relation to FIG. 1, the method is referenced with reference sign 100. A processing means receives at least one image from a NVC 110. At substantially the same time the processing means may receive motion data from a tracker system associated with the NVC. The tracker system may track at least the orientation of the NVC or an object of known relation to the NVC. The tracker system may comprise a system similar to that described in PCT Publication WO 2017/042578, hereby incorporated by reference. Another appropriate tracking system may be used.

At 120 the processing means may modify the received image to remove smear from the image. The modification is based on the knowledge of the motion of the NVC and the shutter time of the NVC.

At 130 the modified image is output for display to a user. This may comprise sending the modified image to the display device. This may also comprise displaying the modified image to the user.

In some examples the image may be processed in substantially real-time such that the image displayed to the user is substantially instantaneous. In applications where the image is displayed to a user on a display in real time, the processing should be carried out on the display or helmet. This avoids extra latency. However, if real time use is not required the image may be processed at a different location to the display.

FIG. 2 illustrates a method, 200, in accordance with some examples. At 210 a first sequential image and a second sequential image are received. The images may be received from two consecutive frames of the camera. However, depending upon the frame rate of the camera the frames may not be consecutive. The first sequential image and the second sequential image are received at a known time interval.

At 220 the first sequential image and the second sequential image are aligned based on the known time interval between the images, the shutter speed of the NVC and motion data provided by the tracker system. The motion data may comprise a change in orientation of the NVC which may allow the change in orientation of the images to be determined.

At 230 the aligned images may be averaged. In some examples averaging the images may comprise averaging the pixel intensities. Averaging pixels is also advantageous as it results in a reduction of other types of noise. For example averaging pixels may reduce the appearance of speckle in images.

At 240 the averaged image is output. The image may be output to a processing means, the processing means configured to provide instructions to cause a display the image to a user. In some examples outputting the image may comprise displaying the image to a user on a display.

In some examples the frame rate of the NVC may be equal to the frame rate of a display to display the image to the user. In some examples the frame rate of the NVC may be different from the frame rate of the display.

In some examples the known time interval between the first sequential image and the second sequential image may be less than the shutter speed. In some examples the known time interval between the first sequential image and the second sequential image may be different to the shutter speed.

FIG. 3 describes a method substantially similar to the method described with relation to FIG. 2. At 310 n sequential images are received, where n is at least 2. The images may be received from two consecutive frames of the camera. However, depending upon the frame rate of the camera the frames may not be consecutive. The n sequential images are received at a known time interval.

At 320 the n sequential images are aligned based on the known time interval between the images, the shutter speed of the NVC and motion data provided by the tracker system. The motion data may comprise a change in orientation of the NVC which may allow the change in orientation of the images to be determined.

At 330 the aligned n images may be averaged. In some examples averaging the images may comprise averaging the pixel intensities.

At 340 the averaged image is output. The image may be output to a processing means, the processing means configured to provide instructions to cause a display the image to a user. In some examples outputting the image may comprise displaying the image to a user on a display.

Figure 4:
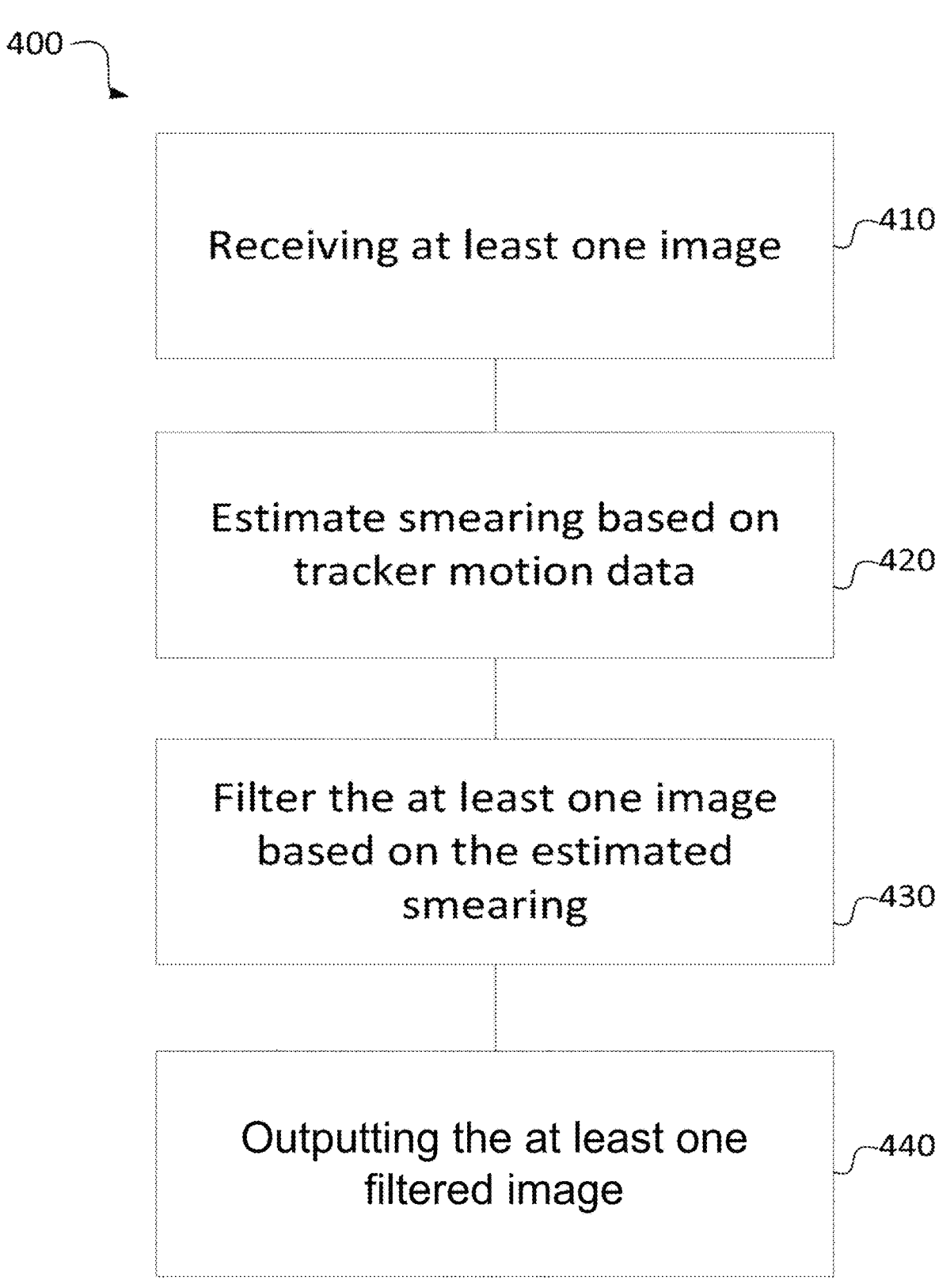
FIG. 4 illustrates a method to filter an image according to some examples.

FIG. 4 illustrates a method 400 in accordance with some examples. The method is substantially similar to the method described with reference to FIG. 1. The method may be used independently of the method described with relation to FIGS. 2 and 3, or may be used in combination with the method described with relation to FIGS. 2 and 3.

Method 400 comprises, at 410, receiving an image. The image may be recorded using a NVC.

An estimate of smearing is made at 420 based on motion data from a tracker system. The motion data may comprise a change in orientation of the NVC during the shutter open time. The estimate of smearing may comprise a point spread function (PSF). The PSF is the function which represents the function by which the image was smeared.

The image is filtered, at 430, using a filter based on the estimate of the smearing. The filter may additionally be based on an estimate of noise in the image. The filter may comprise a Wiener filter. The image may be transformed prior to filtering. In some examples the transformation may comprise a discrete Fourier transform. Transforming the image prior to filtering may allow the image to be filtered more efficiently. A Wiener filter may be preferable to an inverse filter, as an inverse filter may amplify noise in the image resulting in a worse image. The Weiner filter reduces the amount of correction based on the level of noise, hence a compromise between fully correcting the image and but not adding too much noise.

At 440 the filtered image is output. The image may be output to a processing means, the processing means configured to provide instructions to cause a display the image to a user. In some examples outputting the image may comprise displaying the image to a user on a display. The image may be output still in the transformed domain and the inverse transform performed at a later point, or may be transformed back into the original domain using an inverse transformation. In some examples the transformation may comprise an inverse Fourier transformation or a discrete inverse Fourier transformation.

Figure 5A:
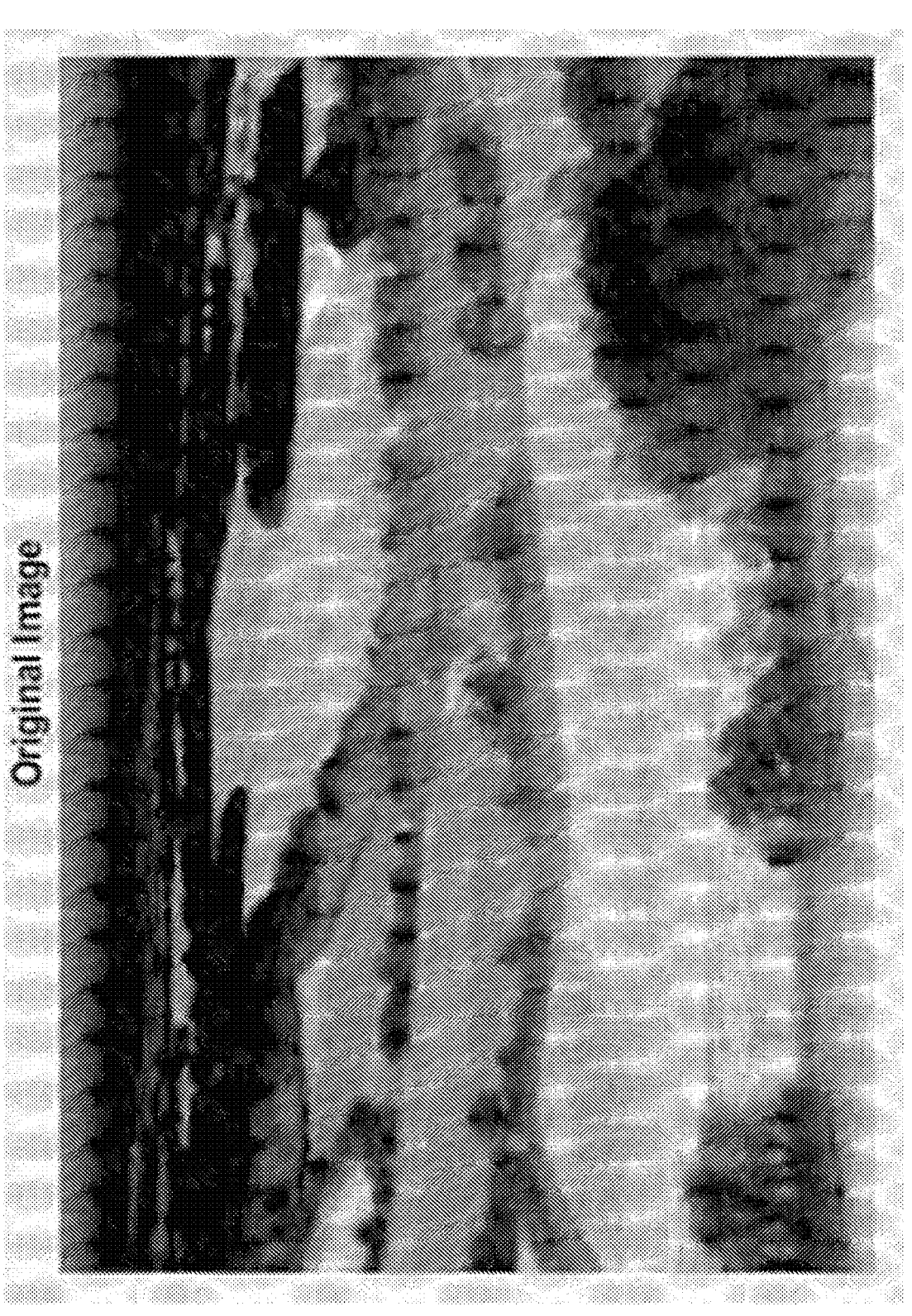
FIG. 5a illustrates an image captured by a night vision camera.
Figure 5B:
FIG. 5b illustrates the image after with simulated motion smear and noise applied.
Figure 5C:
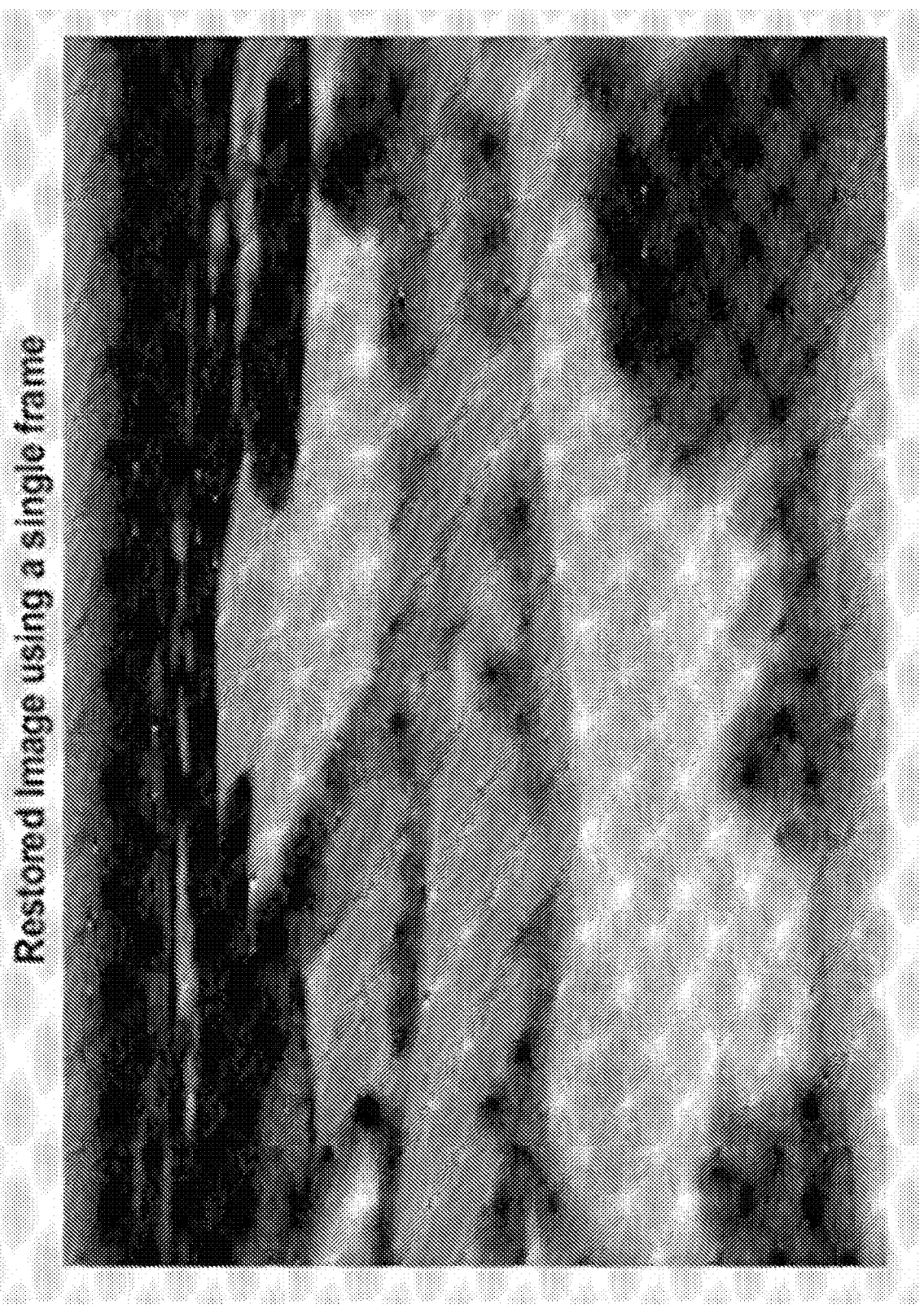
FIG. 5c illustrates the filtered image.

A filtered image using the method 400 is illustrated in FIGS. 5*a-c*. FIG. 5*a* represents an image recorded by a night vision camera without any significant smearing. In FIG. 5*b* the image has had smear and random noise and speckle applied to it to simulate what an user of a NVC may observe when seeing a smeared image. The noise and speckle is independent of motion, and smearing is motion dependent.

FIG. 5*c* illustrates the image when the image has been filtered using a method substantially as described with reference to FIG. 4. As can be observed in FIG. 5*c* the smearing is substantially reduced. However, as the noise is independent of motion of the NVC, the noise has been smeared.

Figure 5D:
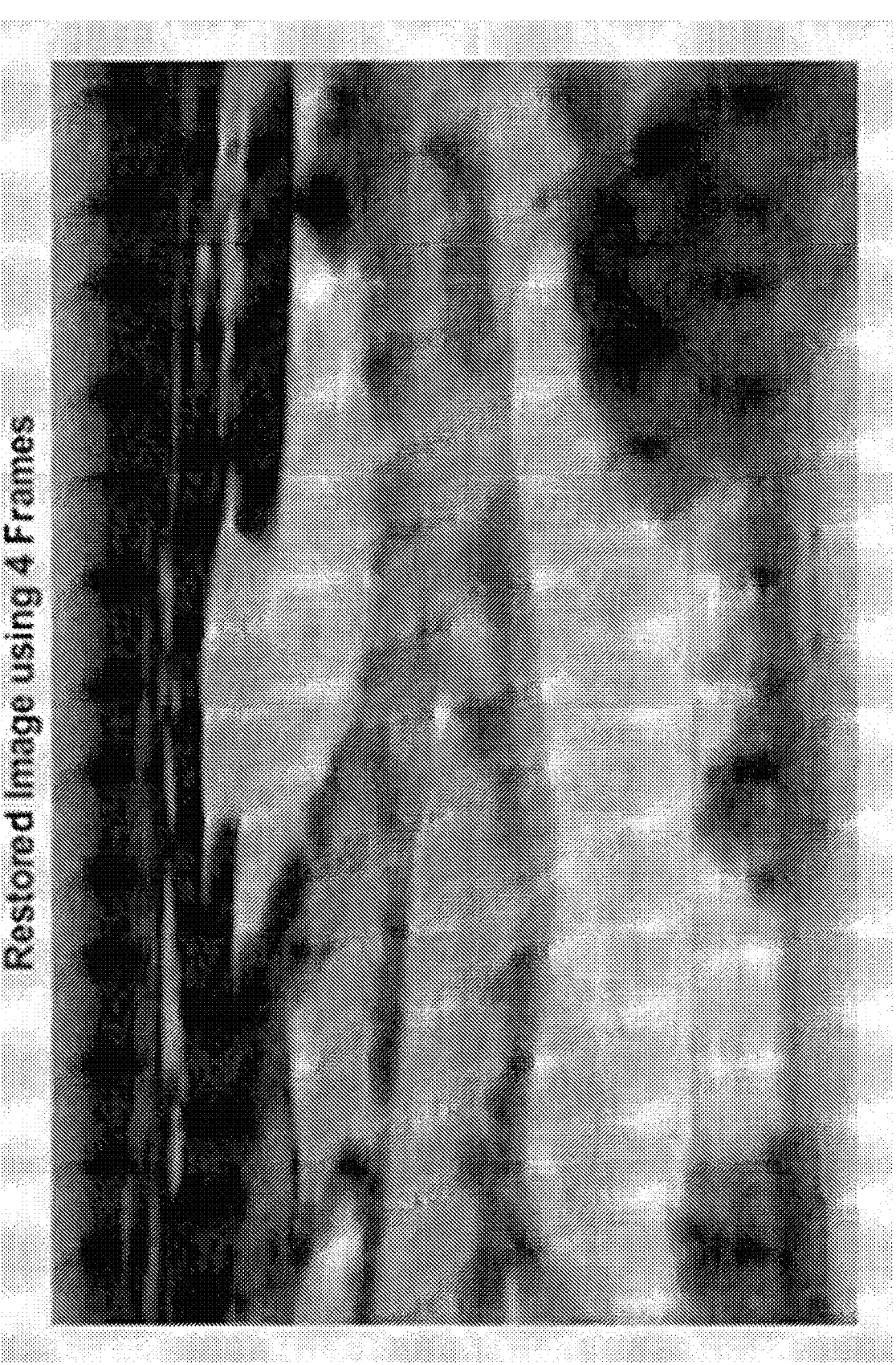
FIG. 5d illustrates an averaged and filtered image.

The presence of noise may reduce the effectiveness of the filtering process. To reduce the impact of noise the image may be filtered prior to passing the averaged image to the filter. FIG. 5*d* illustrates an image where the four frames have been aligned and averaged prior to filtering. As can be seen in FIG. 5*d* the appearance of speckle is reduced compared to FIGS. 5*b* and 5*c*, and more detail of the image is viewable.

A method to average sequential images and filter the averaged image is illustrated in FIG. 6. The method 600 comprises, at 510, receiving at least two sequential images. The images may be received from two consecutive frames of the camera. However, depending upon the frame rate of the camera the frames may not be consecutive. The at least two sequential images are received at a known time interval.

At 620 the at least two sequential images are aligned based on the known time interval between the images, the shutter speed of the NVC and motion data provided by the tracker system. The motion data may comprise a change in orientation of the NVC which may allow the change in orientation of the images to be determined.

At 630 the aligned images may be averaged. In some examples averaging the images may comprise averaging the pixel intensities.

An estimate of smearing is made at 640 based on motion data from a tracker system. The motion data may comprise a change in orientation. The change may comprise a delta angle value or may comprise an angular rate. The estimate of smearing may comprise a point spread function (PSF). The PSF is the function which represents the function by which the image was smeared.

The image is filtered, at 650, using a filter based on the estimate of the smearing. The filter may additionally be based on an estimate of noise in the image. The filter may comprise a Wiener filter. The image may be transformed prior to filtering. In some examples the transformation may comprise a discrete Fourier transform. Transforming the image prior to filtering may allow the image to be filtered more efficiently.

At 660 the averaged image is output. The image may be output to a processing means, the processing means configured to provide instructions to cause a display the image to a user. In some examples outputting the image may comprise displaying the image to a user on a display. The image may be output still in the transformed domain, or may be transformed back into the original domain. In some examples the transformation may comprise an inverse Fourier transformation.

The Wiener filter may be used to estimate the optimum image as follows:

$$\hat{F}(u, v) = \left( \frac{1}{H(u, v)} \frac{|H(u, v)|^2}{|H(u, v)|^2 + K} \right) G(u, v)$$

where:

G(u,v) is the discrete fourier transform (DFT) of the captured image, $\hat{F}(u, v)$ is the DFT of the estimated corrected image, H(u, v) is the DFT of the PSD (power spectral density) causing the smearing, $$K = \frac{S_\eta(u, v)}{S_f(u, v)},$$

$S_\eta(u, V)$ is the power spectrum of the noise, $S_f(u, v)$ is the power spectrum of the image (without smear or noise).

K is pre-calculated prior to use of the system, $S_f(u,v)$ is estimated based on a typical image and $S_\eta(u, v)$ is calculated based on the known (estimated) noise performance of the camera. Typically K may be adjusted to optimise the trade-off between final image noise and the sharpness of the image. K may also be adjusted to take into account the differing noise levels depending on the electronic gain of the camera. I.e. at lower light levels where the gain of the camera is increased, K is increased to increase the emphasis on smoothing.

The final image is calculated by performing an inverse DFT on $\hat{F}(u,v)$.

To decrease the amount of spatial ringing due to the edge effects of the DFT, the image may be blurred at the edges prior to performing the DFT.

Figure 7:
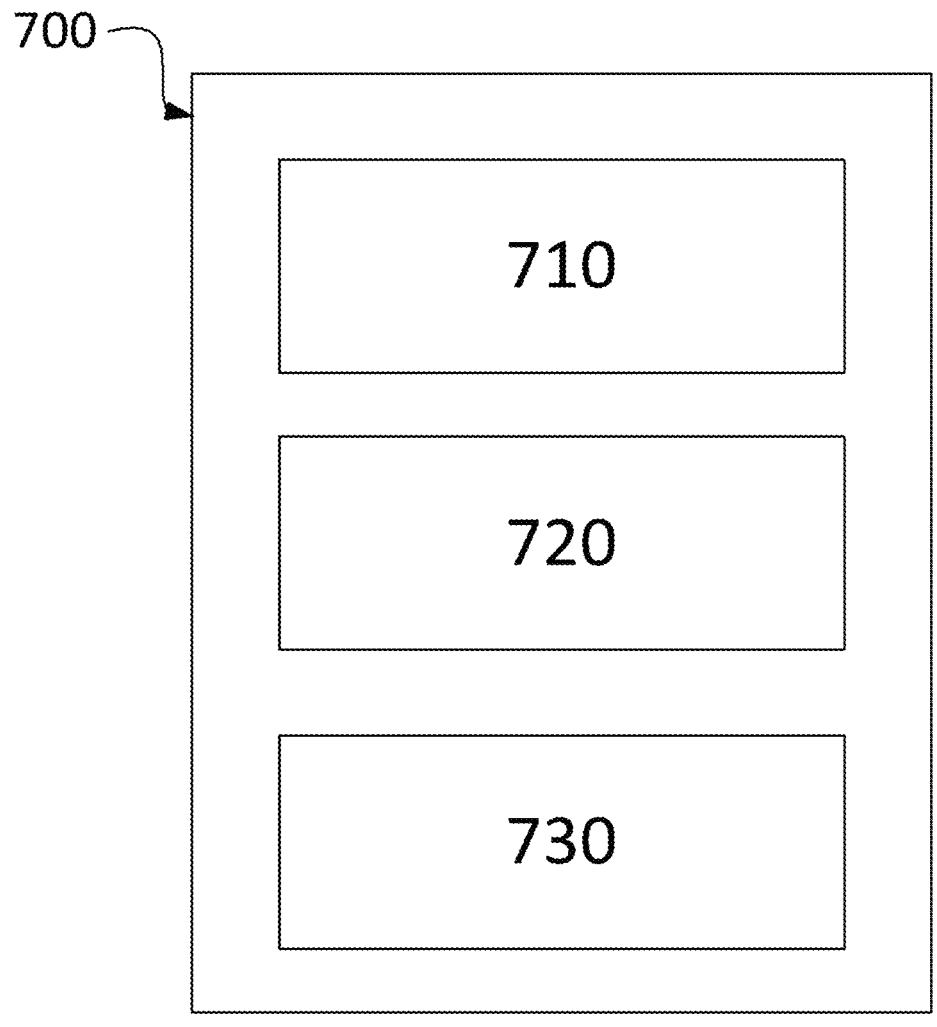
FIG. 7 illustrates a processing means according to some examples.

FIG. 7 illustrates a processing means 700 according to some examples. The processing means 700 comprises a first circuitry 710, a second circuitry 720 and a third circuitry 730.

The first circuitry 710 is configured to receive receiving at least one image from a night vision camera.

The second circuitry 720 is configured to modify the at least one image, based on motion data from a tracker system and a shutter time of the night vision camera, to remove smear from the image.

The third circuitry 730 is configured to output the modified at least one image.

The second circuitry 720 may be configured to align at least two sequential images based on motion data from the tracker system, and after aligning the at least two sequential images, averaging pixel intensities over the aligned at least two sequential images.

Aligning the at least two sequential images based on motion data from the tracker system may comprise calculating a change in rotation of the night vision camera between the at least two sequential images.

The second circuitry 720 may be configured to apply a filter to the at least one image, wherein the filter coefficients of the filter are based on motion data from the tracker system.

The second circuitry 720 may be configured to average pixel intensities over the at least two sequential images prior to applying the filter.

In some examples the filter may comprise a Weiner filter.

In some examples the frame rate of night vision camera is higher than a display system frame rate.

In some examples a field of view of the night vision camera is larger than a field of view of a display to display the modified image to a user.

In some examples the second circuitry 720 may be configured to estimate a point spread function associate with the at least one image.

In some examples the second circuitry 720 may be configured to estimate a measure of noise in the image.

In some examples the motion data comprises an orientation of the night vision camera.

Although the above techniques have been described with reference to night vision cameras, the methods are applicable to any type of camera where smearing is caused by motion of the camera whilst the shutter is open and the speed of the motion is comparable to the shutter time of the camera. In some examples the methods described may be applied to a night vision camera on a head mounted display on an aircraft, by leveraging the existing head tracking system. In some examples the methods may also be applied to a camera on a moving platform, such as a drone which comprises tracking software.

It is also understood that a camera may not have a mechanical shutter, and as such shutter speed or time may refer to an electronic shutter the time that the sensors detect light in a frame. The methods are equally applicable to a mechanical or an electronic shutter.

The invention claimed is:

1. A method comprising:

receiving at least two sequential images from a night vision camera;

aligning the at least two sequential images based on motion data from a tracker system, and after aligning the at least two sequential images, averaging pixel intensities over the aligned at least two sequential images, to generate an averaged image, wherein the motion data comprises a change in orientation of the night vision camera from which a change in orientation of the at least two sequential images is determined and which is used in the aligning;

applying a filter to the averaged image, to generate a filtered averaged image, wherein one or more filter coefficients of the filter are based on the motion data from the tracker system and a shutter time of the night vision camera; and outputting the filtered averaged image.

2. The method according to claim 1, wherein the at least two sequential images from the camera are from non-consecutive frames from the camera.

3. The method according to claim 1, wherein aligning the at least two sequential images based on the motion data from the tracker system comprises calculating a change in rotation of the night vision camera between the at least two sequential images.

4. The method according to claim 1, further comprising:

transforming, prior to applying the filter to the averaged image, the averaged image from a first domain to a second domain; and transforming, prior to outputting the filtered averaged image, the filtered averaged image from the second domain back to the first domain.

5. The method according to claim 1, wherein the filter comprises a Weiner filter.

6. The method according to claim 1, wherein a frame rate of the night vision camera is higher than a display system frame rate.

7. The method according to claim 1, wherein a field of view of the night vision camera is larger than a field of view of a head mounted display or a head up display to display to display filtered averaged image to a user.

8. The method according to claim 1, wherein the filter is based on an estimate of smearing, the method comprising estimating, based on the motion data from the tracker system, smearing in at least one of the at least two sequential images, so as to provide the estimate of smearing, wherein the estimate of smearing includes a point spread function, the point spread function being a function which represents a function by which the at least one of the at least two sequential images was smeared.

9. The method according to claim 8, wherein the filter is based on an estimated measure of noise in the at least one of the at least two sequential images.

10. The method according to claim 1, wherein prior to applying the filter, the method comprising applying a Fourier transform to the averaged image.

11. The method according to claim 10, wherein after applying the filter, the method comprises applying an inverse Fourier transform to the filtered averaged image.

12. The method according to claim 11, wherein the inverse Fourier transform is an inverse discrete Fourier transform.

13. The method according to claim 10, wherein the Fourier transform is a discrete Fourier transform.

14. The method according to claim 1, wherein outputting the filtered averaged image comprises displaying the filtered averaged image via a display of a head mounted display or a head up display.

15. A processing system comprising:

a first circuitry configured to receive at least two sequential images from a night vision camera;

a second circuitry configured to align the at least two sequential images based on motion data from a tracker system, and after aligning the at least two sequential images, the second circuitry is configured to average pixel intensities over the aligned at least two sequential images, to generate an averaged image, and the second circuitry configured to apply a filter to the averaged image, to generate a filtered averaged image, wherein one or more filter coefficients of the filter are based on the motion data from the tracker system and a shutter time of the night vision camera, and wherein the motion data comprises a change in orientation of the night vision camera from which a change in orientation of the at least one image is determined; and a third circuitry configured to output the filtered averaged image.

16. The processing system according to claim 15, wherein the at least two sequential images from the camera are from non-consecutive frames from the camera.

17. The processing system according to claim 15, wherein the third circuitry is configured to output the filtered averaged image by causing display of the filtered averaged image via a display of a head mounted display or a head up display, and wherein the processing system is part of head mounted display or a head up display.

18. A non-transitory machine-readable medium encoded with instructions that when executed by one or more processors causes a process to be carried out, the process comprising:

receiving at least two sequential images from a night vision camera;

aligning the at least two sequential images based on motion data from a tracker system, and after aligning the at least two sequential images, averaging pixel intensities over the aligned at least two sequential images, to generate an averaged image, wherein the motion data comprises a change in orientation of the night vision camera from which a change in orientation of the at least two sequential images is determined and which is used in the aligning;

applying a filter to the averaged image, to generate a filtered averaged image, wherein one or more filter coefficients of the filter are based on the motion data from the tracker system and a shutter time of the night vision camera; and outputting the filtered averaged image.

19. A processing system comprising: the one or more processors and the non-transitory machine-readable medium of claim 18.

20. The non-transitory machine-readable medium according to claim 18, wherein outputting the filtered averaged image comprises causing display of the filtered averaged image via a display of a head mounted display or a head up display.

* * * * *